United States Patent [19]

Messier

[11] Patent Number: 4,750,325
[45] Date of Patent: Jun. 14, 1988

[54] CHAIN LINKS

[76] Inventor: Fernand Messier, 2001 Union Street, Saint-Césaire, Canada, J0L 1T0

[21] Appl. No.: 36,314

[22] Filed: Apr. 9, 1987

[51] Int. Cl.$^4$ .............................................. F16G 13/08
[52] U.S. Cl. ........................................... 59/78; 59/91; 59/5; 59/6; 59/901; 59/84; 198/731; 198/851; 474/230; 474/233; 474/234; 474/236
[58] Field of Search ........................ 59/90, 91, 5, 6, 4, 59/7, 901, 78, 82, 84; 198/728, 731, 733, 849, 850, 851; 474/208, 229, 230, 233, 234, 235, 236

[56] References Cited

U.S. PATENT DOCUMENTS

| | | |
|---|---|---|
| 543,356 | 7/1895 | Schmidt . |
| 1,260,065 | 3/1918 | Ryan . |
| 1,430,834 | 10/1922 | Nichols .................................... 59/90 |
| 1,485,520 | 3/1924 | Nichols .................................... 59/93 |
| 2,398,898 | 10/1943 | St. Pierre . |
| 2,451,254 | 5/1944 | St. Pierre . |
| 2,738,643 | 3/1956 | Money et al. . |
| 3,961,702 | 6/1976 | Blok ..................................... 198/731 |
| 4,570,436 | 2/1986 | Wilkie ......................................... 59/4 |
| 4,679,392 | 7/1987 | Nakagawa ............................... 59/80 |

FOREIGN PATENT DOCUMENTS

| | | | |
|---|---|---|---|
| 47974 | 12/1894 | Canada . | |
| 51950 | 2/1918 | Canada . | |
| 855434 | 11/1970 | Canada . | |
| 59114 | 4/1983 | Japan ................................... 198/731 |
| 6540 | of 1895 | United Kingdom ................ 474/230 |

Primary Examiner—David Jones

[57] ABSTRACT

A chain link having a pair of curved extremities and being generally in the shape of an elongated loop. The loop defines two sides which converge towards the middle of the link where the two sides are rigidly jointed together, as by a weld, thereby forming a pair of interior spaces progressively narrowing towards the middle. Such link is adapted for use in alternation with pin links in a chain designed to remove waste material in a livestock enclosure. A method of making the link is further disclosed.

2 Claims, 1 Drawing Sheet

U.S. Patent   Jun. 14, 1988   4,750,325
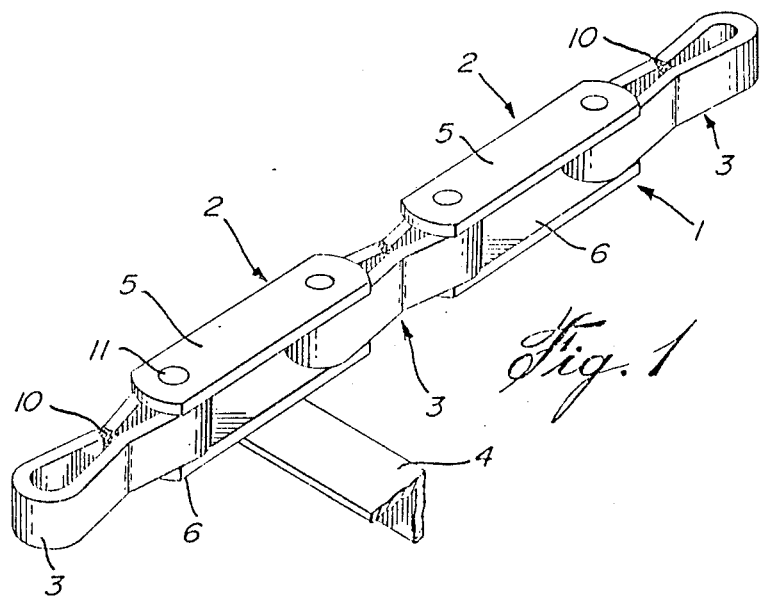
Fig. 1
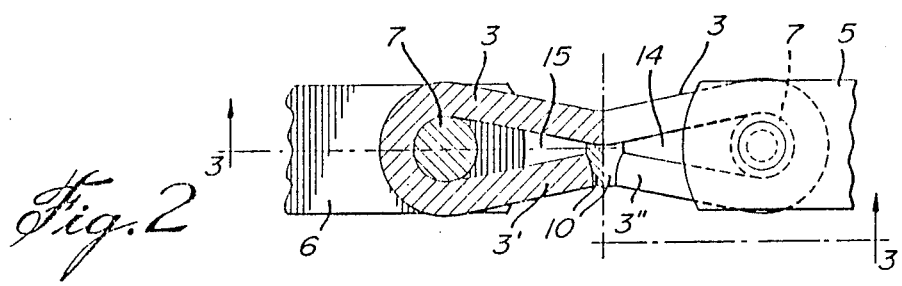
Fig. 2
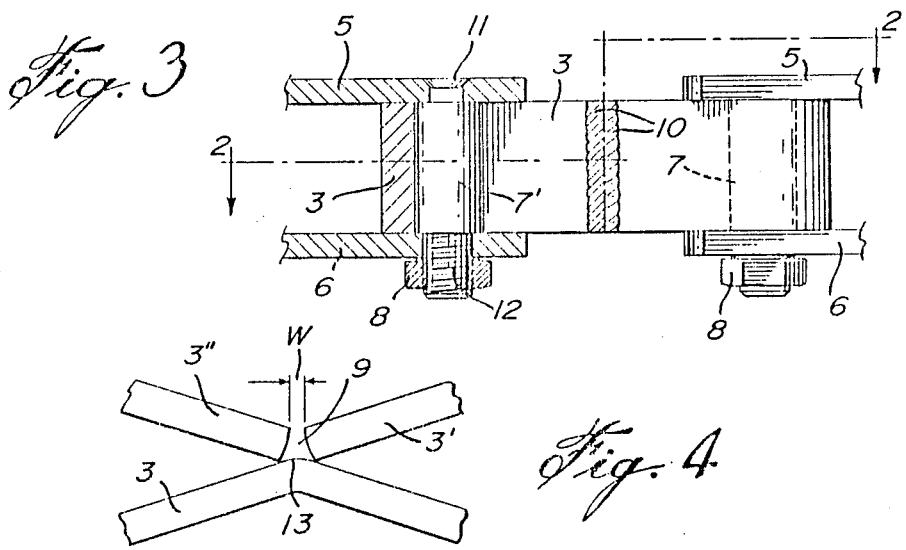
Fig. 3
Fig. 4

CHAIN LINKS

FIELD OF THE INVENTION

The present invention relates to chain links and a method for making an improved link.

BACKGROUND OF THE INVENTION

Chains of the "endless" type are used for a variety of applications. More specifically, such chains are used in barns for commercial animals, such as livestock. The chain is adapted for movement around the perimeter of the barn, behind each stall, and has a plurality of scrapers attached thereto, so that the manure can be removed to a location outside the barn, as is known. Such systems are known as stable cleaners.

Chains adapted for the above purpose are typically made with loop links alternating in position along the chain with pin links. Till now, the connection between the two kinds of link has been relatively loose. As a result, activating the chain causes jerks as the chain becomes taut, which jerks may lead to the breakage of either kind of link.

OBJECTS OF THE INVENTION

It is therefore a first object of the present invention to provide a chain loop link which effectively eliminates any jerky movement between the two kinds of link constituting the above chain.

It is another object of the present invention to provide a chain link of the character described, which is very strong and simple in design.

SUMMARY OF THE INVENTION

The above and other objects and advantages of the instant invention are realized according to a preferred embodiment comprising a loop link adapted to form a chain in alternating sequence with a pin link.

Each pin link is characterized by a pair of vertically-spaced longitudinal rigid upper and lower members joined together by orthogonally-oriented pivot pins at both ends of the link. The pin links are thus open along their sides and opposite ends.

Each loop link, which forms the gist of the present invention, is preferably made of flat metal bar stock.

The method of making the loop link may include the following steps:

(a) forming an elongated loop in the bar stock by bending a length of the latter, wherein the inner radius of curvature of each extremity of the loop is only slightly larger than the radius of a pivot pin of a pin link, and wherein a narrow space is left between the two free ends of the bar. These two free ends face each other on the side of the loop opposite the continuous side at the middle of the loop;

(b) bending inwardly the middle of both sides of the loop, so that they are in contiguous relationship;

(c) welding across the entire width of the bar the two free ends of the loop link together and also to the middle of the continuous side. Thus, two inner spaces are defined in the loop link, parted by the weld. Each inner space narrows toward the center of the link.

BRIEF DESCRIPTION OF THE DRAWINGS

The above will be more clearly understood by having reference to the preferred embodiment of the invention, illustrated by way of the accompanying drawings, in which:

FIG. 1 is a perspective view of a segment of chain made of loop links according to the invention, also showing pin links and a portion of a scraper attached to one of the latter;

FIG. 2 is a sectional view taken along lines 2—2 of FIG. 3;

FIG. 3 is another sectional view taken along lines 3—3 of FIG. 2; and

FIG. 4 is a bottom plan view of the middle portion of a loop link prior to welding.

Like numerals indicate like elements throughout the drawings.

DETAILED DESCRIPTION OF THE PREFERRED EMODIMENT

FIG. 1 shows a chain 1 according to the invention. Chain 1 includes, in alternation, pin links 2 and loop links 3. The former are provided with scraper elements of which a portion of one is shown at 4.

Each link 2 consists of an upper rigid strip 5 and a lower rigid strip 6. Extending vertically between the two strips 5 and 6 at both ends, are a pair of pin members 7. The upper part of each pin 7 has a countersink 11 in strip 5, while the lower portion is threaded at 12 through strip 6 and locked in place by a nut 8. The middle portion 7' of pins 7 is smoothly surfaced.

FIGS. 2 to 4 illustrate a loop link 3. As stated above, it is formed by bending a length of metal bar stock with the two ends 3', 3" of the length closely facing each other. The middle 13 of the continuous side of the loop is then pressed towards the other side having the free ends 3' and 3", the latter side being also pressed, resulting in the configuration shown in FIG. 4. A slot 9, having a minimum width W and of a general V-shape, is thus formed. It is then a simple procedure to introduce the weld metal 10 into slot 9 to effectuate a strong permanent bonding.

The inner radius of curvature at both extremities of a loop link 3 is only slightly larger than the radius of a pin 7, thereby allowing each loop link 3 and adjacent pin links 2 to pivot easily relative to each other. Yet any jerking of the chain resulting in a collision of a pin 7, with one extremity of a loop link, is positively eliminated, because each end portion of the loop converges longitudinally towards the weld, thereby locking each pin 7 in position. In other words, the two interior spaces 14, 15 lessen in width towards the weld.

What I claim is:

1. In a chain including a plurality of loop links and pin links pivotally interconnected in alternating manner, each pin link including a pair of spaced parallel elongated plate members and pivot pins interconnecting both ends of said plate members and normal thereto, each loop link made from a metal bar of generally rectangular cross-sectional shape with end faces generally normal to said bar, said bar bent and forming an elongated loop having the shape of numeral 8 when seen in side elevation, the central section of said bar defining one side of said loop and forming an in-turned V-shaped bend centrally of said loop, the two end sections of said bar defining the opposite side of said loop and forming an inturned V-shape, said end faces being contiguous to the apex of said V-shape bend and spaced from each other to form a gap exposing said end faces and said apex all across said bar and a weld filling said gap, extending all across said bar and joining said end faces to each other and to said one side at said apex, the two extremities of said loop defining two partly cylindrical throughbores receiving the pins of two adjacent pin links.

2. A chain as defined in claim 1, forming an endless stable cleaning conveyor chain and further including scraper blades secured to the elongated plates of said pin links on the same side of said chain and extending substantially normal to the longitudinal axis of said pin links.

* * * * *